United States Patent Office 3,654,190
Patented Apr. 4, 1972

3,654,190
FIRE RETARDANT INTUMESCENT PAINT
Donald Levine, Silver Spring, Md., assignor to the United States of America as represented by the Secretary of the Navy
No Drawing. Filed May 28, 1970, Ser. No. 41,641
Int. Cl. C08c 17/10; C08d 13/10
U.S. Cl. 260—2.5 FP      4 Claims

ABSTRACT OF THE DISCLOSURE

Fire retardant intumescent paint comprising (1) a binder such as chlorinated natural rubber, solid vinyl-toluene/butadiene resin and mixtures thereof; (2) fire retardant materials such as melamine, ammonium polyphosphate or tris (2,3-dibromopropyl) phosphate and dipentaerythritol or tripentaerythritol, (3) a source of chlorine and a material to provide slippage such as a chlorinated paraffin, (4) a solvent such as a 50—50 mixture of toluene and xylol, (5) an anti-settling agent, (6) a coloring agent such as titanium dioxide or a mixture of yellow oxide and black iron oxide; and (7) a surfactant.

BACKGROUND OF THE INVENTION

This invention generally relates to paint compositions and more particularly to fire retardant intumescent paint.

The concept of employment of intumescent paint as a fire retardant is old in the art. However, the intumescent paints of the prior art have suffered from a number of disadvantages. For example, the prior art paints have been slow drying paints so that a relatively long drying period was required before any article onto which the paint was applied could be handled. These prior art paints were also relatively soft and therefore were prone to chip when subjected to rough handling. Furthermore, these paints lacked good brushability so that it was difficult to apply these paints to articles without a large expenditure in time and effort. The prior art paints were also water permeable and therefore were prone to degrade when exposed to moist environments such as the sea. Furthermore the char formed by prior art paints were weak and could easily be blown away if the fire had a velocity component or if there was a wind. Thus, although fire retardant intumescent paints have been known and used there has been a desire to find other paints which did not have the shortcomings of the prior art paints.

SUMMARY OF THE INVENTION

Accordingly, one object of this invention is to provide a fire retardant intumescent paint.

Another object of this invention is to provide a fire retardant intumescent paint which dries relatively rapidly.

Another object of this invention is to provide a fire retardant intumescent paint which is relatively hard and which is capable of withstanding rough handling.

A further object of this invention is to provide a fire retardant intumescent paint which possesses good brushability and which is therefore easily applied.

A still further object of this invention is to provide a fire retardant intumescent paint which resists degradation well when subjected to the environment of the sea.

A still further object of this invention is to provide a fire retardant intumescent paint which foams quickly and has a relatively long cook-off time.

Yet another object of this invention is to provide a fire retardant intumescent paint whose char has consistency and which is not easily blown away by a fire which has a velocity component or by a wind.

These and other objects of this invention are accomplished by providing a fire retardant intumescent paint comprising (1) a binder selected from the group consisting of chlorinated natural rubber, solid vinyl-toluene/butadiene resin and mixtures thereof; (2) fire retardant materials such as melamine, ammonium polyphosphate or tris (2,3-dibromopropyl) phosphate and dipentaerythritol or tripentaerythritol, (3) a lubricant and source of chlorine such as a chlorinated paraffin, (4) a solvent, (5) an anti-settling agent, (6) a coloring agent such as titanium dioxide or a mixture of yellow oxide and black iron oxide, and (7) a surfactant.

DESCRIPTION OF THE PREFERRED EMBODIMENT

The fire retardant intumescent paint of this invention comprises a number of different materials each of which is used for a specific purpose.

The binder of the fire retardant intumescent paint of this invention can be either chlorinated natural rubber which has a chlorine content of about 67% or any solid vinyl-toluene/butadiene resin or mixtures thereof. Thus, either of these materials may be used as the entire binder or one can use any combination of these materials so long as the binder content of the paint does not exceed the limits hereinafter discussed. The chlorinated natural rubber should have a chlorine content of about 67% to be effective in the operation of this invention. A product which meets this requirement is available under the name Parlon from the Hercules Powder Co., Wilmington, Del. The only requirement of the vinyl-toluene/butadiene resin is that it be in the solid state before it is mixed with the other components of this invention. A product which meets this requirement is available under the name Plilite VT which is available from the Goodyear Tire and Rubber Co., Akron, Ohio. The function of the binder in this paint composition is to act as a char former.

Additionally, the composition of this invention must have a series of components which will react to liberate water. These materials include (a) melamine (b) dipentaerythritol or tripentaerythritol and (c) ammonium polyphosphate or tris (2,3-dibromopropyl) phosphate. It is important that the ammonium polyphosphate have a phosphate content of about 90%. It is believed, but the invention does not wish to be bound by this theory, that the ammonium polyphosphate or tris (2,3-dibromopropyl) phosphate acts as a source of phosphorus when the paint is exposed to fire and the phosphorus thereupon reacts with the alcohol with melamine acting as a catalyst. The product which is formed breaks down at a lower temperature than does the original products and liberates water. Ammonium polyphosphate is available under the name Phos-Chek P/30 from Monsanto, St. Louis, Mo. The function of this group of reactants is to form water which will act as an insulating barrier between the flame of the fire and the article coated with the paint.

The chlorinated paraffin is merely a mixture of paraffins which have been chlorinated. The chlorine content of the paraffin should be in the neighborhood of about 70% and cannot vary greatly from this percentage. This material provides slippage to the paint composition and also acts as a source of chlorine. It is theorized that this material either gives off chlorine gas directly or does so thru a series of steps. This gas acts as a fire retardant by pushing the flame away from the article which the instant paint coats. This gives the binder a better chance to form a char which will act as the fire retardant material once the liberation of the gas has ceased. A product which meets the requirements of the hereinbefore described chlorinated paraffin is available from Diamond Alkali Co., Cleveland, Ohio under the name of Chlorowax 70.

The instant intumescent fire retardant paint composition also contains a solvent. The purpose of the solvent is to aid in mixing the other components so that a uniform product is obtained. The solvent will of course evaporate when the paint is applied and dried. It will be understood by those skilled in the art that the dry paint will contain all the other ingredients hereinbefore and hereinafter listed except for the solvent which should nearly completely evaporate. A preferred solvent for the paint of this invention is 50—50 mixture of toluene and xylol but as will be understood by those skilled in the art many other solvents can be used in the paint composition of this invention since the actual solvent used is not a critical feature of this invention. Examples of other possible solvents which can be used in the composition of this invention are mineral spirits, MEK and high flash naphtha. Toluene and xylol are the preferred solvents because they dry very rapidly, usually within about 2–3 minutes.

An anti-settling agent is also necessary in the paint composition of this invention. Any of the well known anti-settling agents used in the paint arts can be used with the instant paint composition since the actual composition of the anti-settling agent is not a critical feature of this invention. Some common anti-settling agents used in the paint arts are Bentone 38 (Montmorillonite) available from the National Lead Co., New York, N.Y.; Post 4 and Thixcin R available from Baker Chemical Co., Phillipsburg, N.J.

A coloring agent is also added to give the desired color and to impart body to the paint. If a white paint is desired $TiO_2$ can be added. On the other hand if an olive drab color is desired a mixture of yellow oxide and black iron oxide is added.

Aditionally, a surfactant is also added to the hereinbefore described fire retardant intumescent paint composition. Any of the well known surfactants, such as lecithin, used in the paint arts can be used in the paint composition of the instant invention since the nature of this ingredient is also not critical.

The general nature of the invention having been set forth, the following examples are presented as specific illustrations thereof. It will be understood that the invention is not limited to these specific examples but is susceptible to various modifications that will be recognized by one of ordinary skill in the art.

Typical examples of white and olive drab (O.D.) formulations in percentage of each constituent would be as follows:

|  | White | O.D. |
| --- | --- | --- |
| Chlorinated natural rubber, 67% Cl (Parlon) | 1.25 | 1.15 |
| Solid vinyl-toluene/butadiene resin (Pliolite VT) | 5.73 | 5.53 |
| Melamine | 14.45 | 14.43 |
| Dipentaerythritol | 9.20 | 9.21 |
| Ammonium poly phosphate, 90% phosphate content (Phos-Chek P/30) | 30.71 | 31.00 |
| Chlorinated paraffin, 70% Cl (Chlorowax 70) | 2.36 | 2.46 |
| Toluene | 15.00 | 14.97 |
| Xylol | 15.00 | 14.97 |
| Anti-settling agent (thixcin "R") | 0.40 | 0.30 |
| $TiO_2$ | 5.40 | |
| Surfactant (lecithin) | 0.50 | 0.61 |
| Yellow oxide | | 3.07 |
| Black iron oxide | | 2.30 |

Because there are at least three different chemical reactions taking place (formation of char, chlorine and water) and each is needed if the paint is to be fire retardant it is very important that the various constituents of the paint be present in the proper proportions. If improper proportions are used any one of the reactions which must take place to yield the desired fire retardant properties may not take place. Thus, for example, if insufficient binder is present the char that does form will be chalky and will tend to blow away. In view of this a very delicate balance exists between the various substituents and there is a relatively narrow variation in the quantity of each material which can be used to form a paint which is fire retardant and intumescent. The permissible variation of the substituents are as follows:

|  | Percent |
| --- | --- |
| Total binders | 6.45–7.50. |
| Melamine | 14–15. |
| Dipentaerythritol or tripentaerythritol | 9–9.5. |
| Ammonium polyphosphate or tris(2,3-dibromopropyl) phosphate | 28.5–33. |
| Chlorinated paraffin | 1.3–3.5. |
| Solvent | At least about 25. |
| Anti-settling agent | 0.2–0.6. |
| Surfactant | 0.25–0.75. |
| Coloring agents | 4.4–6.5. |

It should be noted that when a white paint formulation is desired the binder content should not be lower than about 6.70%.

Although the intumescent paint composition of the invention works well on all types of fires it is especially useful on fuel fires and other relatively hot fires. When applied to bombs and similar articles which were exposed to fuel fires the paint of the invention has drastically increased the cook-off time over the prior art fire retardant paint compositions.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A fire retardant intumescent paint comprising:
   (a) 6.45–7.50% of a binder selected from the group consisting of chlorinated natural rubber with a chlorine content of about 67%, solid vinyl-toluene/butadiene resin and mixtures thereof;
   (b) 14–15% melamine;
   (c) 9–9.5% of an alcohol selected from the group consisting of dipentaerythritol and tripentaerythritol;
   (d) 28.5–33% of a phosphorus containing material selected from the group consisting of ammonium polyphosphate with a phosphate content of about 90% and tris(2,3-dibromopropyl) phosphate;
   (e) 1.3–3.5% of a chlorinated paraffin with a chlorine content of about 70%;
   (f) at least 25% of a solvent;
   (g) 0.2–0.6% of an anti-settling agent;
   (h) 0.25–0.75% of a surfactant; and
   (i) 4.4–6.5% of coloring agents provided that when said paint is white said binder exceeds 6.70%.

2. A fire retardant intumescent paint according to claim 1 wherein said binder is a mixture of chlorinated natural rubber with a chlorine content of around 67% and solid vinyl-toluene/butadiene resin, said alcohol is dipentaerythritol, said phosphorus containing material is ammonium polyphosphate with a phosphate content of about 90%, said solvent is a mixture of xylol and toluene and said coloring agents are selected from the group consisting of $TiO_2$ and a mixture of yellow oxide and black iron oxide.

3. A fire retardant intumescent paint according to claim 2 wherein said binder comprises 1.25% chlorinated natural rubber with about a 67% chlorine content and 5.73% solid vinyl-toluene/butadiene resin, said melamine comprises 14.45%, said dipentaerythritol comprises 9.20%, said ammonium polyphosphate with about a 90% phosphate content comprises 30.71%, said chlorinated paraffin with about a 70% chlorine content comprises 2.36%, said solvent comprises 15% xylol and 15% toluene, said anti-settling agent comprises 0.40%, said coloring agent is 5.40% $TiO_2$ and said surfactant comprises 0.50%.

4. A fire retardant intumescent paint according to claim 3 wherein said binder comprises 1.15% of chlorinated natural rubber with about a 67% chlorine content and 5.53% of solid vinyl-toluene/butadiene resin, said melamine comprises 14.43%, said dipentaerythritol comprises 9.21%, said ammonium polyphosphate with about a 90% phosphate content comprises 31.00%, said chlorinated paraffin with about a 70% chlorine content comprises 2.46%, said solvent comprises 14.97% xylol and 14.97% toluene, said anti-settling agent comprises 0.30%, said coloring agent comprises 3.07% yellow oxide and 2.30% black iron oxide and said surfactant comprises 0.61%.

References Cited

UNITED STATES PATENTS

| | | | |
|---|---|---|---|
| 3,021,293 | 2/1962 | Simon | 260—2.5 FP |
| 3,037,951 | 6/1962 | Basto | 260—2.5 FP |
| 2,057,999 | 10/1936 | Bowlby | 260—3.5 |
| 2,984,640 | 5/1961 | Kaplan | 260—2.5 FP |
| 2,804,398 | 8/1957 | Hooks | 260—2.5 FP |

JOHN C. BLEUTGE, Primary Examiner

U.S. Cl. X.R.

106—16; 252—4, 5, 8.1; 260—3.3, 3.5, 5, 28.5 B, 32.8 A, 33.4 R, 33.6 A, 41.5 R, 45.7 P, 725, 735, 738, 757